United States Patent [19]
Brockel et al.

[11] Patent Number: 6,058,260
[45] Date of Patent: May 2, 2000

[54] METHODS AND APPARATUS FOR PLANNING AND MANAGING A COMMUNICATIONS NETWORK

[75] Inventors: Kenneth H. Brockel, Neptune; William P. Sudnikovich, Laurence Harbor; Michael J. Harrigan, Oceanport; Kenneth D. Chaney, Forked River; Arvids Vigants, Red Bank; William T. Barnett, Colts Neck, all of N.J.

[73] Assignee: The United States of America as represented by the Secretary of the Army, Washington, D.C.

[21] Appl. No.: 09/097,322

[22] Filed: Jun. 15, 1998

Related U.S. Application Data

[63] Continuation-in-part of application No. 08/489,598, Jun. 12, 1995.

[51] Int. Cl.[7] .............................. G06G 7/48; G06G 7/62
[52] U.S. Cl. ............................. 395/500.25; 395/500.34
[58] Field of Search ........................ 395/500.25, 500.34

[56] References Cited

U.S. PATENT DOCUMENTS 5,669,063   9/1997   Brockel et al. .

OTHER PUBLICATIONS

J.A. Schiavone et al, "A Regression Model for Forecasting Microwave Radio Fading at Palmetto, GA", IEEE Transactions on Antenna and Propagation, vol. AP–34, No. 7, pp. 936–942, Jul. 1986.

K.H. Brockel et al, "Line–of–Sight Radio Fading Prompts Remedial Program", Signal Magazine, Nov. 1992.

Harrigan et al, "24–hour Network Performance Management System", MILCOM 94 Conference Technical Paper, Ft. Monmouth, NJ, Oct. 2–5, 1994.

Procopio et al, "Line–of–Sight Propagation Reliability Working Group, Rain Propagation Reliability Forecasting Method", Space and Terrestrial Communications Directorate, U.S. Army, CECOM, Technical Memorandum, May 17, 1993.

(List continued on next page.)

*Primary Examiner*—Kevin J. Teska
*Assistant Examiner*—Hugh Jones
*Attorney, Agent, or Firm*—Michael Zelenka; George B. Tereschuk

[57] ABSTRACT

A method for automatically planning and managing the performance of a communications network comprising a propagation forecasting step where propagation forrecast algorithms form a propagation forecast from weather inputs and a traffic forecasting step where traffic forecast algorithms form a traffic forecast from traffic data inputs and a network planning step where planning algorithms display an automated network model. During a forecast updating step, meteorological measurements and radio traffic measurements are continuously provided, resulting in adjusted propagation and traffic forecasts, which are then followed by a network realignment step to adjust the network. During a model comparison step, an artificial intelligence program continuously compares the model, the model adjustments, the realigned network and the network performance parameters with each other. A coefficient adjustment step adjusts the propagation, traffic and planning algorithms. In a reconfiguration instructions step, taking into account the meteorological and radio traffic measurements, the adjusted propagation forecast, the adjusted traffic forecast and network performance parameters, reconfiguration instructions are developed and transmitted to network operators. Also provided is an automated communications network planning apparatus for converting meteorological data and traffic data into a network model, capable of adjustment and updating, shown on a network terminal display.

42 Claims, 4 Drawing Sheets

OTHER PUBLICATIONS

Procopio et al, "Tactical Line–of–Sight Radio Propagation Reliability Modeling", MILCOM 93 Conference Technical Paper, Boston, Mass., Oct. 11–14, 1993.

Brockel et al, "NPT—A Success Story Evolving from Teamwork and Innovation", MILCOM 93 Conference Technical Paper, Boston Mass., Oct. 11–14, 1993.

Barnett, W.T., "Multipath Propagation at 4, 6, and 11 GHz", The Bell System Technical Journal, vol. 51, No. 2, Feb. 1972.

METHODS AND APPARATUS FOR PLANNING AND MANAGING A COMMUNICATIONS NETWORK

CONTINUATION-IN-PART

This application is a continuation-in-part of United States Patent and Trademark Office application Ser. No. 08/489,598, entitled, "Methods and Apparatus for Planning and Managing a Communications Network," filed on Jun. 12, 1995, by the same inventors herein, and about to be abandoned. This continuation is being filed under 35 USC § 120 and 37 CFR § 1.53, and priority from that application is hereby claimed.

GOVERNMENT INTEREST

The invention described herein may be manufactured, used and licensed by or for the Government of the United States of America without the payment to us of any royalties thereon.

BACKGROUND OF THE INVENTION

1. Field of the Invention

This invention relates to radio communications networks. More particularly, this invention relates to planning and management of dynamic communications networks based upon propagation forecasting, modeling techniques and the ability to adapt the network according to continually updated propagation and traffic forecasting.

2. Description of the Prior Art

A major problem in the field of radio communications is caused by the environment and its effects on network performance, making these elements significant network planning factors. Meteorological phenomena that affect the propagation reliability of communications links include, depending on the radio frequency of the link, atmospheric refraction, layering (ducting), rain, absorption and fog. Examples of environmental phenomena effecting communications reliability include fading caused by clear-air atmospheric layering on microwave links, rain attenuation on millimeter wave links and attenuation by fog of optical links. These changeable environmental factors have a profound impact on the dynamic networks used by the U.S. Army for tactical communications.

Independent of such harsh environmental factors, both the configuration and geographical location of these networks can change on a daily or even hourly basis. Combining the harsh environmental effects of phenomena such as fading, rain attenuation and attenuation by fog with the changeable configuration and geographical location of the U.S. Army's tactical communications networks can seriously degrade anticipated network performance. A stationary communications network for long-term use can be readily designed based on typical, historical local weather patterns and their effect on propagation, however, a moveable communications network operating in different climates must be tailored to local conditions that exist at the time of use.

Traditional propagation reliability methods are based on long-term historical meteorological statistics. While propagation forecasting has undergone improvement in recent years, communications network planning and management today is not based upon the known weather forecast and its probable effect on radio propagation. See for example, *A Regression Model for Forecasting Microwave Radio Fading at Palmetto, Georgia*, J. A. Schiavone and S. H. Hermiller, IEEE Transactions on Antennas and Propagation, Vol. AP-34, No. 7, pp. 936–942, July 1986.

There have been advances in terms of propagation and reliability modeling during fading using historical statistics resulting in a propagation reliability model for tactical line-of-sight radio which has been developed for a large range of climates, terrains, fade margins and path lengths. See, for example, *Line-of-Sight Radio Fading Prompts Remedial Program*, K. H. Brockel and A. Vigants, SIGNAL Magazine, November 1992. While the effects of weather on propagation are well known, up to now there have been no practical solutions for quickly calculating the propagation effects from predicted short-term weather conditions and then rapidly adjusting the network plan or components of a communications system to meet given network performance parameters.

Up to now, the effects of weather and communications-traffic patterns on the communications quality of dynamic networks are typically either anticipated based upon historical data, or compensated for by man-calculated adjustments to networks in the field. Current tactical network management systems, based on traditional traffic engineering using long-term traffic performance statistics or rules of thumb, do not provide a facility for automatically planning and engineering communications networks based on current traffic forecasts and the real-time analysis of current traffic loads. Tactical networks cannot be planned in this manner because they are continually dynamic. In a tactical environment, a battlefield commander needs to design a communications network based on tonight's or tomorrow night's weather if that is the scheduled time of the military operation. Those concerned with the planning and management of communications networks in either a tactical or commercial environment have long recognized a need for an automated method to plan a communications system based on anticipated weather, propagation patterns and network traffic, monitor and calculate the impact of such environmental changes on the network quickly and then adjust the communications network for optimized performance based upon these environmental changes.

This invention fulfills that long-recognized need by providing an automated method of network planning and management which will automatically plan, engineer and direct the installation and continuing operation of a radio communications network based upon planning tools integrating the effects of forecast weather, environmental feedback, real-time network status and necessary traffic dimensions, a dynamic network model and automatic experience-based improvements of algorithms used in the dynamic network model. An automated communications network planner is also provided.

The present invention addresses the practical needs of the tactical network planner and manager by using near-future propagation forecasts for network planning and real-time propagation information for network management, with an emphasis on 24-hour forecasting because many meteorological phenomena have a diurnal (24-hour) cycle. By utilizing updated weather, performance and traffic data received from the network, with the aid of artificial intelligence (AI) techniques, necessary environment-driven changes can be made continuously and on a real-time basis operating on large masses of data which only a computer can effectively handle. Further, this invention utilizes tools such as computer models, algorithms, computer simulations and AI-based tools in a new way along with currently available tactical system/network management technology.

While this invention may be readily used in tactical military communications systems, there are numerous commercial applications in areas such as mobile or cellular telephones, as well as any communications system that can be incapacitated by adverse propagation conditions. A key aspect of the method and apparatus of this invention is the ability to use and automatically update propagation, weather and traffic algorithms so that the communications system can automatically send reconfiguration "change orders" to the network to compensate for the harmful effects of these phenomena.

Examples of propagation forecasting tools may be found in the following references:

"24-Hour Network Performance Management System Technical Paper," Jan. 21, 1993, U.S. Army CECOM Space and Terrestrial Communications Directorate Line-of-Sight Propagation Reliability Working Group;

Michael J. Harrigan, Kenneth H. Brockel, William P. Sudnikovich, Arvids Vigants, William T. Barnett, Stanley Conway-Clough, Richard Wood, Robert Edwards, Joli Toth and Julius Sunshine "24-Hour Network Performance Management System," MILCOM 94 Conference Technical Paper, Fort Monmouth, N.J., Oct. 2–5, 1994;

"Rain Propagation Reliability Forecasting Method Technical Memorandum," May 17, 1993, U.S. Army CECOM Space and Terrestrial Communications Directorate Line-of-Sight Propagation Reliability Working Group; and Network Management Tool Detailed Operational Concepts Document, Jan. 5, 1994. U.S. Army CECOM Space and Terrestrial Communications Directorate Network Management Automation & Integration Working Group. Further, an example of a propagation reliability model may also be found in U.S. Pat. No. 5,669,063, entitled "Method of Establishing Line of Sight Propagation," which was issued as on Sep. 16, 1997, which is hereby incorporated by reference, in which Messrs. Brockel and Sudnikovich are also co-inventors of this invention.

Examples of systems or devices which manage communications networks may be found in the following references:

Eric C. Ericson, Lisa Traeger Ericson, and Daniel Minoli, "Expert Systems Applications in Integrated Network Management," Artech House, Inc., 1989;

"MIL-STD-2045-38000, Network Management for DOD Communications (Draft)," January 4, 1993;

V. J. Procopio, Kenneth H. Brockel, Joseph R. Inserra, Francis G. Loso, Paul A. Major, Kenneth D. Chaney, Robert J. Locher, Arvids Vigants, Mark Riehl and William T. Barnett, "Tactical Line-of-Sight Radio Propagation Reliability Modeling," MILCOM 93 Conference Technical Paper, Boston, Mass., Oct. 11–14, 1993; and K. H. Brockel, Tommy Cheng and MAJ Michael Mitchum, "NPT—A Success Story Evolving From Teamwork and Innovation," MILCOM 93 Conference Technical Paper, Boston, Mass., Oct. 11–14, 1993.

SUMMARY OF THE INVENTION

It is an object of this invention to provide a method for planning and managing a communications network utilizing a number of weather, propagation forecasting and network-planning tools and databases, computer models, a series of automatic feedback loops and continual adjustment of the system's algorithms in order to construct and maintain a dynamic network model and to electronically collect and assimilate feedback from the environment and the network to automatically update the dynamic network model's algorithms and then disseminate initialization or reconfiguration instructions on a real-time basis to the network operators.

It is also an object of this invention to provide an apparatus for planning and managing a communications network.

To attain these and other objects, the method and apparatus of the present invention contemplates linking a number of databases and planning tools in an automated feedback loop so that environmental information pertaining to weather and propagation concerning the network can be used to plan a network by forming a dynamic network model and also adjusting both the dynamic network model and database algorithms on a real-time basis, automatically resulting in reconfiguration instructions for parts of the network requiring adjustment. In order to provide a comprehensive network planning and management, the method and apparatus of the present invention also include databases and planning tools relating to network traffic.

More specifically, the present invention provides a method for planning and then managing the performance of a host communications network comprising a propagation forecasting step to store a plurality of propagation data, known propagation responses to meteorological phenomena and network performance parameters into a propagation forecast means, a traffic forecasting step to store a plurality of traffic data, predicted traffic network data and a plurality of network performance parameters into a traffic forecasting means, a network planning step to form an automated, dynamic network model in a network planning means. During a forecast updating step, a model correction means continuously provides a plurality of meteorological measurements to the propagation forecast means, as well as a plurality of radio traffic measurements to the traffic forecast means, respectively, resulting in the model correction means providing an adjusted propagation forecast and an adjusted traffic forecast to the network planning means followed by a network realignment step to adjust the network, utilizing a means for calculating model adjustments of the network planning means. During a model comparison step, the model correction means, having an artificial intelligence capability, continuously compares the dynamic network model, the model adjustments, the realigned network and the network performance parameters with each other. A coefficient adjustment step adjusts algorithms of the propagation forecast means and the traffic forecast means. These steps are followed by a reconfiguration instructions step, in which the model correction means, taking into account the plurality of meteorological and radio traffic measurements, the adjusted propagation forecast, the adjusted traffic forecast and network performance parameters, develops reconfiguration instructions for transmittal to network operators.

The present invention also provides for an automated communications network planner apparatus for converting meteorological data and traffic data into a dynamic network model meeting a plurality of predetermined performance parameters on a display means. The apparatus creates a dynamic network model based on propagation and traffic forecasts and then updating and adjusting the network model based on updated real-time propagation and traffic data inputs provided to a network planning means by a means for determining model corrections and a number of algorithms.

The terms "dynamic network model," "network model" and "model" as used throughout this specification should be considered to refer to a computer-resident model of the network formed by the network planning means during a model forming step that contains environmental, traffic, or configuration changes relating to the network, having a network system management system, comprising a traffic and link-performance detecting means, to track the status of the network. The dynamic network model is continually revised during operation of the network to include real-time meteorological variables, actual traffic and performance data, and network change and repair information inputs from the model correction means and other sources for constant, real-time comparison and matching of the dynamic network model and the network so that dynamic network model accurately represents the network.

The term "model correction means," as used throughout this specification should be considered to be any mechanism that automatically and continuously determines and compares the configuration and performance of the dynamic network model with the network, analyzes the differences between them, and adaptively fine-tunes and corrects the dynamic network model and algorithms used for its construction to minimize the differences and optimize the configuration and performance of the network for different communications scenarios. The model correction means, having a communications protocol driver means and an Artificial Intelligence capability, automatically receives network inputs including performance data, real-time weather and traffic environments, configuration changes, and fault and repair conditions, continuously compares the dynamic network model, model adjustments, network parameters and network components and automatically outputs information such as actual traffic data, real-time weather data, actual configuration changes, fault and repair data and correction directive signals for real-time adjustments and corrections to the necessary algorithm, database, module, or other portion of the network.

These definitions should apply in conjunction with any other commonly accepted definitions of those terms. The exact nature of this invention, as well as other objects and advantages thereof will be readily apparent from consideration of the following specification relating to the annexed drawings.

BRIEF DESCRIPTION OF THE DRAWINGS

Other features and details of the present invention will become apparent in light of the Detailed Description of the Invention and the accompanying figures wherein.

DETAILED DESCRIPTION OF THE INVENTION

As described in the Background of the Invention, a major problem in radio communications is caused by the weather and its effects on network performance, particularly where the dynamic configuration and diverse geographical locations of the U.S. Army's tactical communications networks in the field require real-time propagation forecasting and propagation-related adjustments in difficult climates. Heretofore, it has not been possible to accurately predict, and react to, the weather's effects on network performance on a real-time basis, however, this invention's utilization of propagation and traffic forecasting techniques, including computerized data entry files, as well as other features of this invention, permits real-time forecasting and the ability to quickly plan and reconfigure the communications network so that the battlefield commander can assure that the communications network will operate at maximum efficiency based on tomorrow night's weather and propagation conditions in a remote location.

Figure 1:
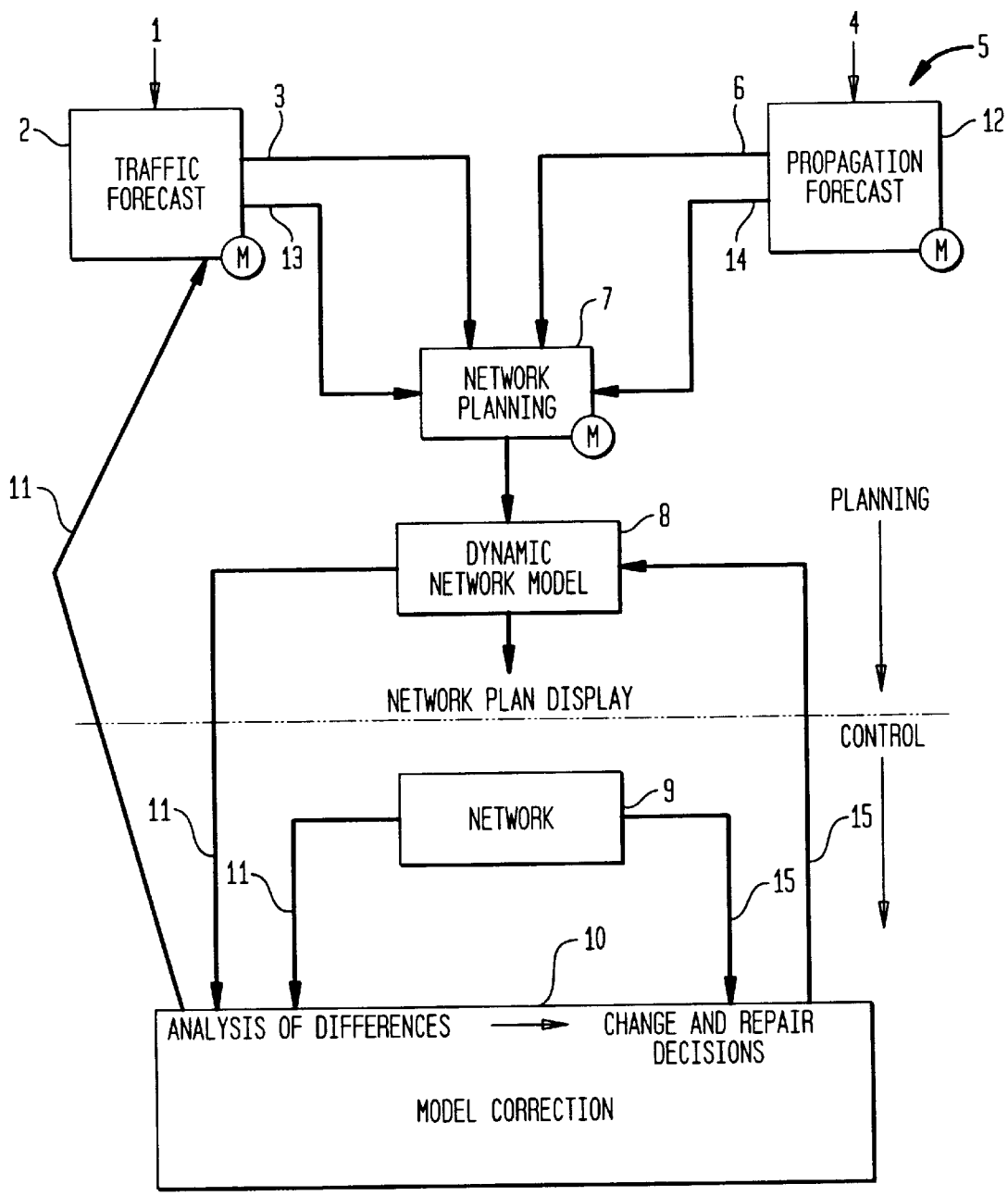
FIG. 1 is a flow chart diagram depicting the first embodiment of the present invention divided into a planning portion and a control portion.
Figure 2:
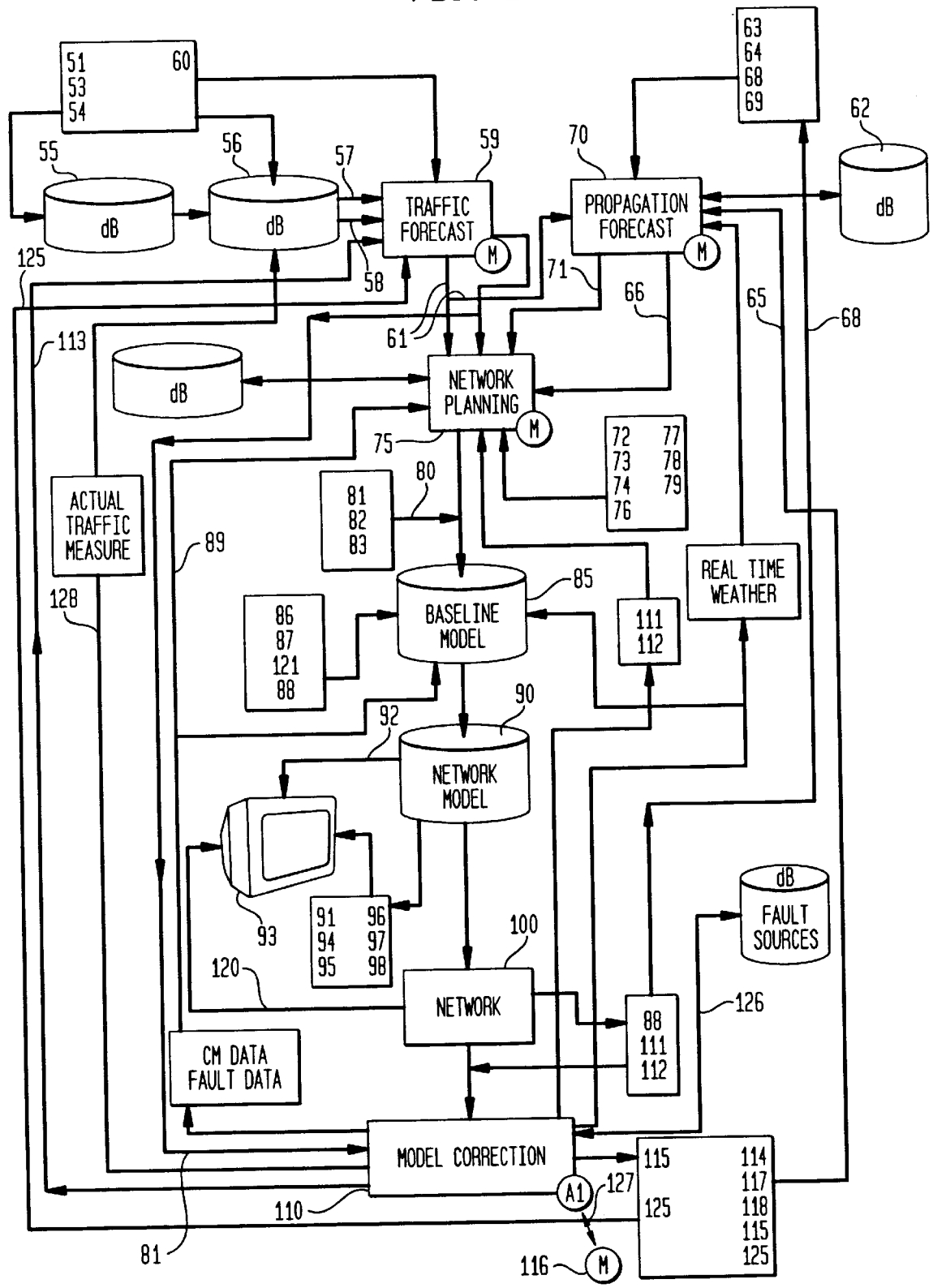
FIG. 2 is a flow chart diagram of the preferred embodiment and the apparatus of the present invention.

The present invention and the "host" communications network may be viewed most simply as being joined in an automatic, adaptive feedback loop which can establish a network plan with a dynamic network model and then constantly monitor and automatically improve communications network performance, having interactive planning and control portions. FIG. 1 is an overview flow chart diagram depicting the steps of the first embodiment of the present invention divided into planning and control portions. The preferred embodiment of the present invention provides greater detail and is depicted in FIG. 2.

Referring now to FIG. 1, the first embodiment of the present invention provides a method for planning and managing a "host" communications network. Beginning with the network planning portion, during a propagation forecasting step a plurality of meteorological forecast inputs, indicated by arrow 4, including a plurality of propagation data, known propagation responses to meteorological phenomena and said plurality of network performance parameters are stored in a propagation database of a propagation forecast means 5, said propagation forecast means 5 having a plurality of propagation algorithms. Said plurality of propagation algorithms of the propagation forecast means 5 forming a propagation forecast output 6 modeling a plurality of communications-link locations allowing optimal performance of a communications network based upon said plurality of network performance parameters and said plurality of meteorological forecast inputs, arrow 4.

A traffic forecasting step comprises entering a plurality of communications requirements inputs, indicated by arrow 1, into a traffic database of a traffic forecast means 2, said traffic forecast means 2 having a plurality of traffic algorithms, in order to store a plurality of traffic data, predicted traffic network data and network performance parameters. Said plurality of traffic algorithms of the traffic forecast means 2 forming a traffic forecast output 3 modeling a plurality of communications links meeting said plurality of communications requirements inputs, arrow 1, and said plurality of network performance parameters. Said propagation forecast means 5 and said traffic forecast means 2, respectively, transmit said propagation forecast output, arrow 6, and said traffic forecast output, arrow 3, respectively, during a network planning step to a plurality of planning algorithms of a network planning means 7 to form an automated, dynamic network model 8, so that the designed network matches expected weather and traffic conditions. Said dynamic network model 8 is displayed to an operator, thus completing the network planning portion of the method of the present invention, as indicated by the solid line bisecting FIG. 1.

The control portion of the method of the present invention entails managing a communications network 9. During a forecast updating step, a model correction means 10 continuously provides a plurality of real-time meteorological measurements, indicated by arrow 12, to said propagation forecasting means 5, as well a plurality of radio traffic measurements, indicated by arrow 11, from said network 9 to said traffic forecast means 2, resulting in said propagation forecast means 5 and said traffic forecast means 2, respectively, providing an adjusted propagation forecast, indicated by arrow 14, and an adjusted traffic forecast, indicated by arrow 13, to said plurality of planning algorithms of the network planning means 7.

In a network realignment step, based upon said adjusted propagation and traffic forecasts, arrows 14 and 13, respectively, said network planning means 7, having said plurality of planning algorithms and a means for calculating model adjustments, realigns said network 9 by instructing operators to alter deployment of communications components of said network 9. In a model comparison step, said model correction means 10, having an artificial intelligence capability, continuously compares said dynamic network model 8, said adjusted propagation and traffic forecasts, arrows 14 and 13, respectively, said realigned network 9 and said plurality of network performance parameters with each other.

During a coefficient adjustment step, said model correction means 10 adjusts said propagation algorithms of the propagation forecast means 5, said traffic algorithms of the traffic forecast means 2, and said planning algorithms of the network planning means 7 based on analysis of differences between performance of said dynamic network model 8 and said network 9. These steps are followed by a reconfiguration instructions step, in which said model correction means 10, taking into account said plurality of real-time meteorological measurements, arrow 12, said plurality of traffic measurements, arrow 11, said adjusted propagation forecast, arrow 14, said adjusted traffic forecast, arrow 13, and said plurality of network performance parameters, develops reconfiguration instructions, indicated by arrow 15, for transmittal to network operators.

Referring now to the drawings, there is shown in FIG. 2, a flow chart diagram depicting the steps of the method of the preferred embodiment of the present invention for managing a "host" communications network, said network 100 having a plurality of radio terminals, a plurality of switching nodes and a plurality of predetermined performance parameters. The first step of the method of the preferred embodiment of this invention comprises a propagation forecasting step to receive and store meteorological information and form a propagation forecast output, indicated by arrow 71. Meteorological information is received and stored because weather-driven effects on propagation are a major source of problems in managing a communications network. Meteorological phenomena affecting propagation reliability of communications-links include, depending on the radio frequency of the link, atmospheric refraction, layering (ducting), rain, absorption and fog. As an example, FIG. 3 is a chart depicting the numerical interrelationship between propagation climate, path length, fade margin, radio frequency and the probability of outage for LOS microwave links.

Figure 3:
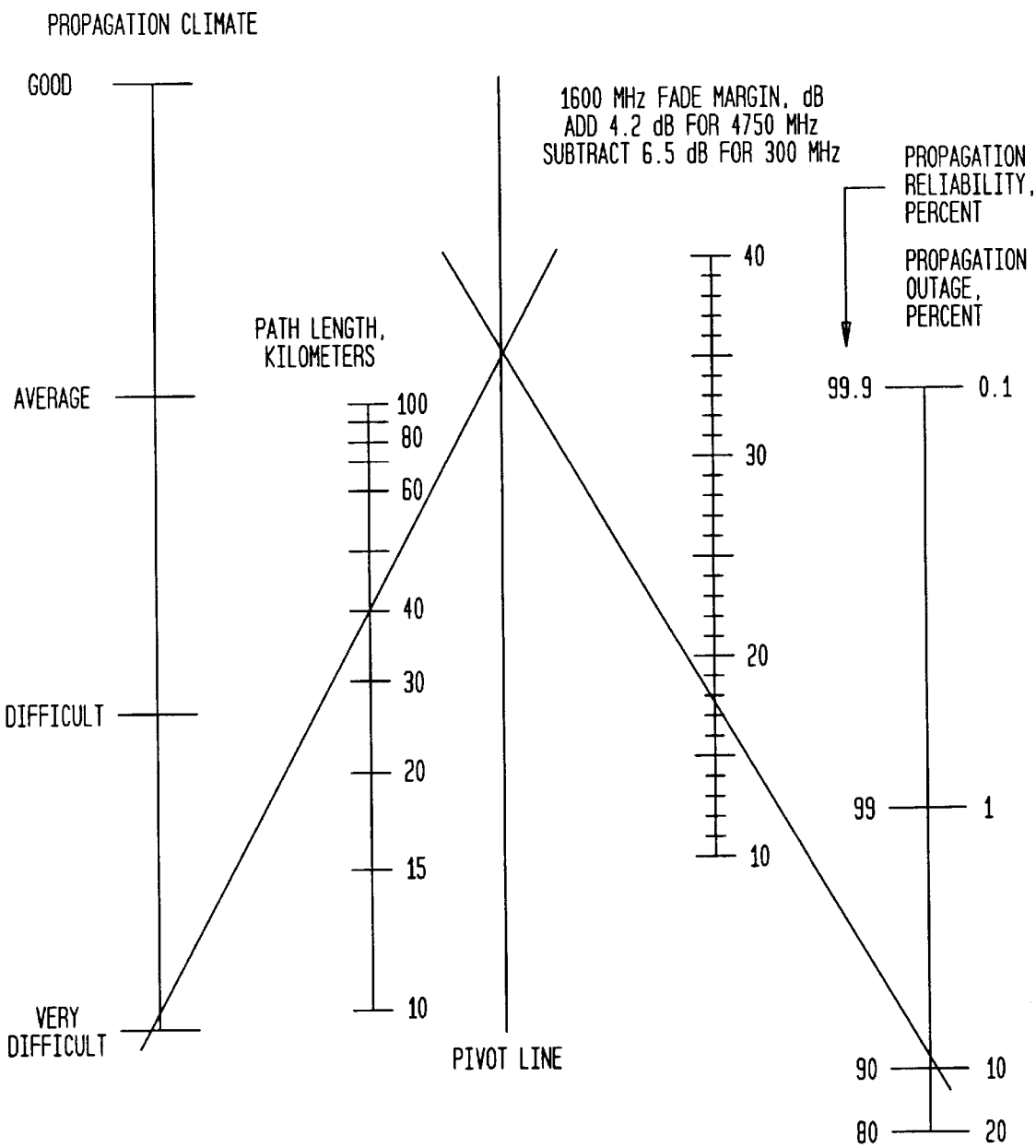
FIG. 3 is a chart depicting the interrelationship among propagation climate, path length, fade margin, radio frequency and the probability of propagation-caused communications failure.

As an example pertaining to FIG. 3, the multipath fading nomogram, or graph, can be used to determine a required fade margin for a specified reliability and for any environmental condition in the Army tactical LOS frequency bands. An operator draws two straight lines on the nomogram to obtain the required fade margin. In the example on the nomogram, the climate category is "very difficult," and the path length is 40 kilometers. An operator draws a line through these two points to the pivot line. Next, the operator draws a line from the pivotline intersection to the specified reliability, which is 90 percent in the example. This corresponds to an outage of 10 percent. The required fade margin is approximately 18 decibels in the frequency band centered on 1600 megahertz. In general, the known and unknown values can occur in arbitrary combinations on the nomogram, provided that the two lines drawn by the user intersect on the pivotline. Said propagation forecasting step of the present invention provides climate and propagation values for a specific 24 hour period, which is far more useful and accurate than historical weather averages over the course of a month or a year.

Referring back to FIG. 2, said propagation forecasting step comprises storing a plurality of meteorological inputs in a propagation forecasting means 70 including inputs from a propagation database 62, said plurality of predetermined network performance parameters and a plurality of known propagation responses to meteorological phenomena, indicated by arrow 63.

Said propagation forecasting means 70, having a propagation reliability methodology based on short-term, predictive meteorology, provides near-future propagation forecasts. A meteorological forecast data input, indicated by arrow 64, is transmitted to said propagation forecasting means 70, and then incorporated into a plurality of propagation forecast algorithms of said propagation forecasting means 70, in order to develop said propagation forecast output, indicated by arrow 71, to a network planning means 75. A propagation database 62 stores a plurality of near-future propagation forecasts and also contains a plurality of historical, long-term propagation data which is used for less accurate network planning when weather forecasts are not available.

In operation, said plurality of propagation algorithms of the propagation forecast means 70, models a first plurality of communications-link locations in said propagation forecast output, arrow 71, which meet said plurality of predetermined performance parameters based upon said plurality of stored meteorological inputs. For example, said propagation forecast output, arrow 71, based on rainy conditions, may require positioning the nodes of said network 100 close together in order to meet said plurality of predetermined network performance parameters. Examples of propagation forecast algorithm well-known to those skilled in the art, include for deep fades, when A is 20 dB or larger, the fading probability P has a simple analytical form:

$$P=100R10^{-A/10}, A>=20$$

where R is the multipath-fade-occurrence factor. For example, if the fade occurrence factor is 0.1 and the fade depth is 20 dB, the probability of fading is 0.1 percent. This means that the received signal power is smaller than one percent of normal for a total of approximately 44 minutes in a month. Another example of a propagation forecast algorithm well-known to those skilled in the art is a CONUS form for R, described in "Multipath Propagation at 4, 6 and 11 GHz," The Bell System Technical Journal, 51(2), Barnett, 1972, is:

$$R=6CFD^3 10^{-10}$$

where D is the path length in km, and F is the radio frequency in MHz (greater than 2000 MHz). Values for the climate and terrain factor C are available from known maps. Another example of a propagation reliability algorithm pertains to description methods for rain and is described further below in connection with FIG. 2. Information relating to said first plurality of communications-link locations includes a description of signal power and noise power for each communications channel in each link.

In regions where said meteorological forecast data input, arrow 64, is unavailable, because, for example, there is no accessible local weather station, said propagation database 62 would be utilized on a standby or substitute basis, thereby still providing said propagation forecast output, arrow 71, to said network planning means 75.

Said plurality of propagation forecast algorithms of the propagation forecast means 70, evaluate the credibility of inputs from said propagation database 62, said plurality of known propagation responses to known meteorological phenomena, arrow 63, and said meteorological forecast data input, arrow 64, and extrapolate those data to areas for which meteorological information is not available to an operator. Further, said propagation forecasting means 70 in forming said propagation forecast output, arrow 71, also receives additional inputs from a traffic forecast means 59, including a traffic forecast output, arrow 61, an equipment availability and characteristics input, indicated by arrow 68, from said network 100 through the model correction means 110, which will be combined with a projected link reliability factor, indicated by arrow 69, for transmission of said propagation forecast output, arrow 71, to a plurality of planning algorithms of said network planning means 75. Said plurality of planning algorithms of the network planning means 75 will calculate the propagation reliability of communications links of said network 100 during said network planning step, which is one of the upcoming steps of the method of this invention.

Also depicted in FIG. 2 is a traffic forecasting step where said traffic forecasting means 59 generates said traffic forecast output, arrow 61, utilizing a traffic database 55 and a predicted database 56. Said traffic database 55 receives as inputs a plurality of input communications requests, indicated by arrow 51, expressed in busy-hour Erlangs for subscriber unit-to-subscriber unit pairs, as well as said plurality of predetermined network performance parameters, or criteria coefficients. Also inputted to said traffic database 55 is a plurality of operational facility data inputs, indicated by arrow 53, describing the number of terminals per each subscriber unit of said network 100 and a plurality of operator-adjusted performance criteria, indicated by arrow 54. Portions of said traffic database 55 are copied onto said predicted traffic database 56, for the planning, and future automatic adjusting of, said network's 100 configuration.

In operation, said predicted traffic database 56, having a plurality of programmed traffic forecast algorithms, calculates a percentage of network-bound traffic, indicated by arrow 57. Said percentage of network-bound traffic, arrow 57, and a traffic forecast input, indicated by arrow 58, is then provided to said traffic forecasting means 59 to form said traffic forecast output, arrow 61, modeling a second plurality of communications-link locations of said network 100, for transmission to said plurality of planning algorithms of the network planning means 75 to complete the planning portion of said traffic forecasting step. Said second plurality of communications-link locations includes a description of signal power and noise power for each communications channel in each link.

For example, said traffic forecast output, arrow 61, may instruct an operator that anticipated traffic conditions such as heavy digital data transmissions necessitate designing said network 100 so that various network components have a larger bandwidth and higher antenna gain in order for said network 100 to meet said plurality of predetermined network performance parameters. In operation, said traffic forecasting step persists somewhat beyond the planning phase and continues during the control portion of the method of this invention, which will be described more fully below.

Referring again to FIG. 2, said network planning step is accomplished by said network planning means 75 forming a baseline network model 85 that is a computer-resident initial planning configuration of said network 100. As network implementation or operation proceeds, said network planning means 75 forms a dynamic network model 90, which is also computer-resident, containing environmental, traffic, or configuration changes relating to said network 100. Said network planning means 75 draws upon the known quantities of communications assets within said network 100 by having a means responsive to messages from said network 100. During said network planning step, said network planning means 75 automatically receives feedback from said network 100 through said responsive means by continually receiving as inputs said propagation forecast output, arrow 71, said traffic data output, arrow 61, and an adjusted traffic needline, arrow 81, in order to generate potential site locations and link connections for said network 100 which will provide optimal communications reliability.

In operation during said network planning step, said network planning means 75 automatically examines pieces of said network 100 on a one-by-one basis in order to speed up the resulting calculations, and either apportions sections of said network 100 to a network manager or amasses portions into super nodes, usually through a plurality of gateway links. Thus during said network planning step, both the operator and said network planning means 75 engineer a network plan output, indicated by arrow 80, to meet said performance parameters of the network 100.

During said network planning step, said network planning means 75 also utilizes a plurality of line-of-sight (LOS) path reliability engineering inputs, indicated by arrow 73, in order to enhance weather forecast-driven propagation capabilities of said network 100, independent of said propagation forecasting means 70. Said LOS path reliability engineering techniques include:

Link optimization;

High-elevation identification;

Path profiling;

Path-loss calculations;

Area radio coverage;

Fade margin determination based on actual location and time of deployment; and

LOS propagation reliability analysis.

For example, using design criteria from the Mobile Subscriber Equipment (MSE) system, the objective of the LOS engineering effort in that communications network is to develop a tactical network consisting of LOS radio links with acceptable bit error rates (BERs) (e.g., not greater than $1\times10^{-5}$). This equals the commercially acceptable data operation BER and exceeds the commercially acceptable voice operation BER by 2.4 dB. A plurality of network planning algorithms of said network planning means 75 uses a link reliability output, indicated by arrow 81, merging with said network plan output, arrow 80, to generate said baseline network model 85.

Calculations of link reliability are well-known to those skilled in the art, for example, calculating link reliability as a function of fade margin for selected values of link path length, along with associated climate value ranges. As described more fully in U.S. Pat. No. 5,669,063 entitled "Method of Establishing Line of Sight Propagation," which has been incorporated herein by reference, a multipath fading analysis can be utilized to calculate link reliability as a function of fade margin (0 to 40 dB) for selected values of link path length (10 to 80 km) for frequencies of 300 MHz, 1600 MHz, and 4750 MHz. The latter are selected as representative of the 225-to-400 MHz, 1350-to-1850 MHz, and 4400-to-5000 MHz frequency bands, respectively. For each of the three frequencies, three values of the climate factor have been selected to span the climate range of application: average CONUS (5.8 dB), difficult CONUS or International (15.8 dB), and very difficult international (25.8 dB). Alternatively, the link fade margin has been calculated as a function of link path length for selected values of link reliability (90, 99, 99.9, and 99.99 percent). The methods and devices of present invention provide a plurality of link reliability algorithms which mathematically express these relationships.

Referring again to FIG. 2, based upon said network plan output, arrow 80, generated during said network planning step, said baseline network model 85, provides an initial configuration of said network 100. Said baseline network model 85 incorporates the extant automated communications network management capability of said network planning means 75 to allocate LOS frequencies, taking into account a list of available frequencies and prohibited frequencies for the area of operation, and generates a nonconflicting list of very high frequencies (VHF's) from which to develop a plurality of RAU/mobile subscriber radiotelephone terminal (MSRT) frequency plans, indicated by arrow 88.

When said network 100 is operational, said baseline network model 85, having a means responsive to a plurality of real-time meteorological variables, indicated by arrow 65, actual traffic and performance data, indicated by arrow 88 and a plurality of network change and repair information inputs, indicated by arrow 89, from said model correction means 110 updates said dynamic network model 90, thereby completing said model forming step.

In light of expected continuing traffic and environmental changes impacting said predetermined performance criteria of the network 100 and to allow said network 100 to continually adapt to such changes, the next step of the method of the present invention is a database updating step where said traffic database 55 and said predicted database 56 of the traffic forecasting means 59 are continually updated based on new traffic information. A plurality of traffic meter and throughput data inputs, indicated by arrow 60, are accessed from a plurality of switches of said network 100 during operations. Said plurality of traffic meter and throughput data inputs, arrow 60, also establish said adjusted traffic needline data, arrow 81, during said database updating step. For example, for a hypothetical four-node network:

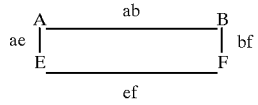

a plurality of circuit switch traffic meters that need to be provided (including some new statistics) for analysis during said database updating step include:

| Link Statistics (traffic outgoing on each connected link, and incoming from each access trunk): | Local-to-Network Statistics (traffic outgoing from originating node into the network): | NEW: Link by Link Statistics (every time destination node sends a Return message, increment counter for link it went over): |
|---|---|---|
| ab, ae | $A_{1-n}$ | $A_{n-1(ab)}$, $A_{n-1(ae)}$ |
| ba, bf | $B_{1-n}$ | $B_{n-1(ba)}$, $B_{n-1(bf)}$ |
| ea, ef | $E_{1-n}$ | $E_{n-1(ea)}$, $E_{n-1(ef)}$ |
| fb, fe | $F_{1-n}$ | $F_{n-1(fb)}$, $F_{n-1(fe)}$ |

A plurality of packet switch statistics derived during said database updating step include number, size and performance of off-local area network (LAN) packets entering said network 100. Based on the existing and new information provided, simultaneous equations, such as the following, are automatically set up by said traffic forecast algorithms of the traffic forecasting means 59:

$$\begin{pmatrix} ab \\ ae \\ \vdots \\ fe \end{pmatrix} = \begin{pmatrix} 1 & 0 & 1 & \ldots & 0 \\ 0 & 1 & 0 & \ldots & 0 \\ \ldots & \ldots & \ldots & \ldots & \ldots \\ 0 & 1 & 0 & \ldots & 0 \end{pmatrix} \times \begin{pmatrix} A \to B_{ab} \\ A \to B_{ae} \\ A \to E_{ab} \\ \vdots \\ F \to E_{fe} \end{pmatrix}$$

where ab is the traffic carried over link ab, and $AB_{ab}$ is the traffic originating at node A destined for node B that was carried over link ab. The equations can be solved based on the existing data to provide:

$$\begin{pmatrix} A \to B \\ A \to E \\ \vdots \\ F \to E \end{pmatrix}$$

where A→B is the total traffic carried from node A to node B. Thus, a plurality of traffic needlines can be discerned from said plurality of traffic meter and throughput data inputs, arrow 60, and used to further update said predicted database 56, during said database updating step.

As new user requirements are inputted to said predicted database 56 during said database updating step, for example, a subscriber unit of said network 100 is required to move to another location or a new battlefield criterion is needed, such packet switch statistics will change said predicted database 56, will alter future planning concerning said network 100 and will result in said adjusted traffic needline 81 being automatically provided as input to said network planning means 75 during said network planning step and to said model correction means 110 during a comparison step, which will be described in further detail below.

Said propagation database 62 of the propagation forecasting means 70 is also updated during said database updating step of the method of this invention by providing real-time measurements from said model correction means 110 to said propagation forecasting means 70. Said model correction means 110 provides to said propagation forecasting means 70 a plurality of real-time propagation information inputs, indicated by arrow 114, to adaptively fine-tune said propagation reliability algorithms of the propagation forecasting means 70, said plurality of real-time measurements of meteorological variables, arrow 65, a plurality of performance inputs, indicated by arrow 117, from said network 100 as well as an equipment availability input, indicated by arrow 118.

Further, in the operation of said database updating step, said propagation reliability algorithms of the propagation forecasting means 70, having sets of equations with coefficients whose values are functions of meteorological parameters, are adaptively fine-tuned by said model correction means 110, consistent with local weather conditions. This adaptive fine-tuning is applied to both a plurality of forecast propagation reliability algorithms and a plurality of real-time propagation reliability algorithms, respectively, of said propagation forecasting means 70 by continually receiving said real-time measurements of meteorological variables, arrow 65, as well as said plurality of performance inputs, arrow 117, transmitted from said network 100 through said model correction means 110 to said propagation forecasting means 70.

Figure 4:
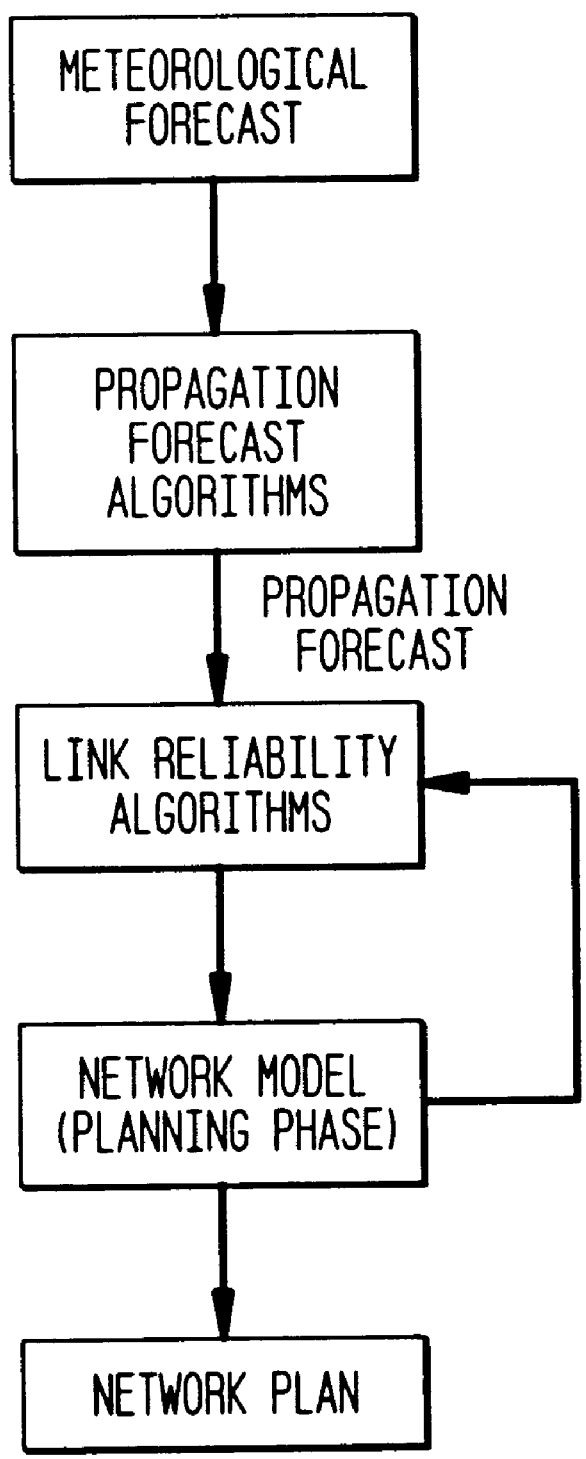
FIG. 4 is a schematic diagram showing the interrelationship among meteorological forecast inputs, a forecast algorithm and a network planning means.

One example of a coefficient determined from said real-time measurements of meteorological variables, arrow 65, is the climate factor (C) in the multipath fading probability (p) for line-of-sight links:

$$P = C \cdot f(D, F, A)$$

where f is a function of path length (D), radio frequency (F), and fade depth (A). The value of C describes atmospheric layering, or ducting, as it relates to multipath fading on the communications-link. Said propagation reliability algorithms of the propagation forecast means 70 include wind speed as one factor because layers do not form during strong wind. Atmospheric multipath fading does not exist in the presence of a gale-force wind. For these reasons, the algorithm for wind speed influence may be subject to adaptive fine-tuning during said database updating step. FIG. 4 is a schematic diagram depicting the interrelationship between said meteorological forecast input, arrow 64, said propagation forecast algorithms, a plurality of link reliability algorithms and said network planning means 75.

Referring back again to FIG. 2, another example of a propagation reliability algorithm forming a part of said propagation forecasting means 70 pertains to description methods for rain. Since traditional meteorological statistics are premised on annual rain fall, the International Radio Consultative Committee (CCIR) bases rain outage calculations on rain rates exceeded for 0.01 percent of the year and provides world charts of 0.01-percent rain-rate values in millimeters/hour. The tactical commander on the digitized battlefield has no practical use for annual outage, therefore more useful propagation information can be provided by obtaining the forecast rainfall for the period of interest and then scaling the CCIR calculations to this rainfall. The scaling coefficient is:

$$\beta = \frac{S}{S_a}$$

where S is the expected accumulation of rain in the forecast period and $S_a$ is the annual historical accumulation of rain for the forecast location, both expressed in millimeters. This expression for $\beta$ is a first approximation that allows solution of a practical problem. The ratio $\beta$ is certainly a significant indicator of the rain outage in the forecast period, but influences related to the type of rain or season of the year are accomplished by a plurality of adaptive fine-tuning algorithms. The scaling approach has been applied to provide calendar-month rain engineering in tactical communications systems such as the MSE Network Planning Terminal (NPT) for Super High Frequency links. Based on these calculations and the scaling approach, said propagation database 62, includes world rain rates, calendar-month rain accumulation and annual rain accumulation.

Following the completion of said network planning and said database updating steps, respectively, said network realignment step utilizes said dynamic network model 90 to reconstruct and realign said network 100 so that it matches said dynamic network model 90. Said model correction means 110 includes a communications protocol driver means which controls a plurality of dynamic protocols of said network 100. Said plurality of dynamic network protocols contain sets of rules used to control and manage said network 100, for example, one of said plurality of dynamic network protocols controls the radio frequency used by said network 100, while another of said plurality of dynamic network protocols would specify the number of retransmitted messages utilized in the event of a link failure or control the type of forward error correction to be employed. Additionally, a network system management system of the dynamic network model 90, having a traffic and link-performance detecting means, tracks the status of said network 100. Said dynamic network model 90, being automatically integrated by a network system management system, provides a signal input, indicated by arrow 92, to said network terminal display means 93 for visually tracking said network 100 by presenting equipment and link status of said network 100. Said signal input, arrow 92, provides a plurality of visual data images, indicated by arrow 94, on said network terminal display means 93. Said network system management system of the dynamic network model 90, is instrumental in developing a plurality of first reconfiguration changes, indicated by arrow 91, transmitted to an operator to enhance both said network 100, as well as said planning algorithms of the network planning means 75.

Once said dynamic network model 90 is initialized by said planning network algorithms of the network planning means 75, said dynamic network model 90 is continuously updated or redesigned to include the predicted state of the configuration of said network 100, as well as inputs relating to factors such as traffic load, propagation, failures, repairs and restorals in order to provide an optimum representation of said network 100 to an operator. A display manager means 98 forms map images from a plurality of Defense Mapping Agency (DMA) digital information databases inputs, indicated by arrow 95, allowing display of networks and threat information over a map background. Said network realignment step also requires said network display means 93 to transmit a plurality of messages, indicated by arrow 97, to the operators, informing them to configure said network 100 in accordance with said dynamic network model 90, as modified by inputs from said traffic forecasting means 59 and said propagation forecasting means 70. Following completion of said network realignment step, said dynamic network model 90 and said network 100 have been matched so that said dynamic network model 90 accurately represents said network 100.

The next step of the method of the present invention is a comparison step where said model correction means 110 will automatically and continuously compare the configuration and performance of said dynamic network model 90 with said network 100, analyze the differences between them, and correct said dynamic network model 90 as well as said propagation forecasting, traffic and planning algorithms used in its construction, in order to minimize those differences and optimize the configuration and performance of said network 100. Said comparison step prepares the way for said reconfiguration instructions step wherein a plurality of second reconfiguration instructions, indicated by arrow 120, will be transmitted to the operators of said network 100.

Minimizing differences between said dynamic network model 90 and said network 100, as well as optimization of said network 100 during said comparison step relates to different battlefield scenarios. Said model correction means 110 automatically receives a plurality of information inputs from said network 100 including said plurality of real-time traffic measurements, arrow 88, a plurality of operator-caused network configuration change inputs, indicated by arrow 111, and a plurality of fault and repair inputs, indicated by arrow 112. Said model correction means 110 automatically generates a plurality of actual traffic data outputs, indicated by arrow 113, to said traffic forecast algorithms of the traffic forecasting means 59 and said predicted traffic database 56. Similarly, said model correction means 110 also automatically generates said plurality of real-time weather data inputs, arrow 64, to said propagation forecast algorithms of the propagation forecast means 70, and sends said plurality of actual configuration change inputs, arrow 111, and said plurality of fault and repair inputs, arrow 112, to said network planning algorithms of the network planning means 75.

The most significant outputs of said model correction means 110, however, are a plurality of correction directive signals, indicated by arrow 125, transmitted to said traffic forecast algorithms of the traffic forecast means 59 and said propagation forecast algorithms of the propagation forecast means 70, respectively, which are used to improve their predictive power. Said traffic forecast algorithms of the traffic forecast means 59 being programmed to contain tables of parameters and coefficients defining the traffic associated with different battlefield scenarios of said network 100. Similarly, said propagation forecast algorithms of the propagation forecasting means 70 being programmed to contain the coefficients of equations associated with the different propagation conditions, particularly weather conditions.

Referring once again to FIG. 2, said model correction means 110 transmits a plurality of correction directive signals, arrow 115, based upon an artificial intelligence (AI) program of said model correction means 110. Said model correction means 110, either identifies groups of associated parameters or groups of associated coefficients, or changes the parameter or coefficient values in said propagation forecast algorithms of the propagation forecast means 70 and said traffic forecast algorithms of the traffic forecast means 59, respectively, when a systematic difference persists. The choice between identifying coefficients and changing the coefficient is primarily a matter of degree, reserving the systemic differences for changing parameters, which when implemented, results in either a redesign or repair of said network 100.

In order to define said plurality of correction directive signals, arrow 115, during said coefficient adjustment step of the method of the present invention, said AI program of the model correction means 110, analyzes the detected differences and decides on the appropriate action (selection and/or change of parameters or coefficients) automatically and in real-time. Furthermore, since said network 100 itself will dynamically change its configuration with new users, different scenarios, new faults and changing meteorological conditions, the analysis provided by said AI program of the model correction means 110 must be adaptive to rapid changes. Said model correction means 110 utilizes said AI program to quickly analyze the actual status of said network 100 and the traffic and propagation conditions. In effect, said model correction means 110, having said AI program, will learn the status of said network 100 by using a knowledge base that comprises a plurality of fault source database inputs, arrow 126, built from said change and repair information inputs, arrow 111, which said model correction means 110 receives from said network 100, and a coefficient adjustment means 116 during a coefficient adjustment step that optimally determines the source of failures in links, equipment and other areas. Said AI program also has the adaptive capability to refine said dynamic network model 90 when said network 100 is deployed in an area for any extended length as said AI program "learns" the local weather and propagation conditions.

Said coefficient adjustment means 116 is utilized as an expert system because said model correction means 110, acting as a central controller for said network 100, must automatically collect, store and assimilate a plurality of actual traffic measurements, indicated by arrow 128, which includes automatically generated switch traffic metering data, major equipment status, link status, nodal labels, and state-of-the-switch data as database input to an another system able to predict performance of said network 100 (e.g., build a case for an anticipated link outage), and replan accordingly. Said coefficient adjustment means 116 comprises three main components which are hierarchically related to each other: (1) a pragmatic component, which incorporates and formalizes the experience of tactical network designers and managers; (2) a syntactical component, which provides purely symbolic, or mathematical, rules of inference; and (3) a semantic component, which interprets the symbolic rules in term s of said network 100.

Said coefficient adjustment means 116 will rely upon an associated knowledge base comprising an extensive set of rules, essentially a collection of "if—then—" conditions. An example of the system requirements necessary to support real-time predictive planning of a communications network, such as:

Keep pace with asynchronous alarm flow;

Maintain an accurate model of the network configuration;

Reason using incomplete data sets, if necessary;

Track changes in problems over time;

Distinguish between source problems and side effects;

Troubleshoot problems in order of severity;

Suspend and resume diagnosis of problems when appropriate;

Track varying probabilities of suspect component failure;

Select the most efficient and informative test available; and

Interpret test results to establish a diagnosis.

Further, many of the rules driving said coefficient adjustment means 116 are probabilistic, meaning that they are valid with a certain level of probability because they are based on experience and incomplete information. For example, a rule that initially predicts the grade of service (GOS) for a field-deployed switch using said traffic database 55 with a probability of, for example, 0.995 which will, on the basis of said actual traffic data input, arrow 113, after a few learning iterations, be able to predict the GOS with a higher probability, for example, 0.999. The validity of the rule itself will have also changed from, for example, a probability of 0.75 to 0.99 as a result of the new data and experience.

Said coefficient adjustment means 116 provides said model correction means 110 with a probability output, indicated by arrow 127, to assist said AI program in executing comparisons of actual conditions, modeled conditions, network performance parameters and said network 100 in order to optimize performance of said network 100, thereby completing said model comparison step.

The final step in the method of the present invention is said reconfiguration instruction step where said plurality of second reconfiguration change orders, indicated by arrow 120, are specified by said model correction means 110 based on its ability to isolate and troubleshoot faults from said plurality of fault source database inputs, arrow 126, generated by said network 100. Said plurality of said second reconfiguration instructions 120 are sent to said network data display means 93 to notify the operators to reconfigure said network 100 with a number of predictive corrective actions to counter the natural and enemy-induced spectrum threats intrinsic to battlefield communications. When all components of said network 100 are operational, said network 100 will replicate said dynamic network model 90.

A number of variations are possible within the steps of the method of the preferred embodiment of this invention. The method of the present invention may be carried out on terrestrial line-of-sight communications networks, as well as communications networks receiving data from a means for inputting data from a plurality of satellites. Referring once again to FIG. 2, in connection with said propagation forecasting step of the method of the preferred embodiment of this invention, in operation a network management work station may host an applications software program, to access said meteorological forecast data input, arrow 64, and said plurality of real-time meteorological information variables, arrow 65. Said propagation forecasting means 70 may also send said traffic forecast output, arrow 61, and an adjusted traffic forecast output, indicated by arrow 66, to said network planning means 75 which along with said equipment availability and characteristics input, indicated by arrow 68, from said network 100 through said model correction means 110, may be combined with a projected link reliability factor, indicated by arrow 69, as part of said propagation forecast output, arrow 71, provided to said network planning means 75 to complete said propagation forecasting step. Said propagation forecasting means 70 may also be a computer program.

During said traffic forecasting step, a plurality of call holding times data inputs for circuit switch calls, packet lengths data inputs for packet switch calls and data inputs from each subscriber unit under different battlefield scenario dependent criteria, such as attack, defend, or retreat, may be provided to said traffic database 55 of the traffic forecast means 59. Said plurality of operational facility data inputs, arrow 53, provided to said traffic database 55 may describe the number of a plurality of telephones and computers forming a part of said network 100. Said plurality of operator-adjusted performance criteria, arrow 54, may include a plurality of maximum link, node blocking and delay probability inputs. Said traffic database 55 may be rolled-up from individual subscribers of said network 100 to a particular subscriber unit, for example an air-defense unit. Said traffic database 55 may permit an operator to select communications equipment options and scenarios, along with associated types of battlefield criteria. Said plurality of traffic meter and throughput data inputs, arrow 60, may be accessed from a plurality of switches of said network 100, such as circuit switches, packet switches and ATM switches, during operations of said network 100. Said traffic forecast means 59 may also be a computer program.

In connection with said network planning step of the method of the preferred embodiment of this invention, said responsive means of the network planning means 75 may automatically receive from said network 100 a switch disability input, indicated by arrow 78, indicating that switches could be disabled or out of commission and thus not useable. Further, in operation during said network planning step, a unit readiness input, indicated by arrow 76, may be provided to said network planning means 75 to account for communications equipment outages occurring while one or more pieces of equipment is removed from said network 100. A subscriber access input, indicated by arrow 77, may be calculated by said network planning means 75 based on a comparison of subscriber unit demand and asset supply of said network 100. Said network planning means 75 may also receive a plurality of circuit and packet traffic requirements, indicated by arrow 78, during said model forming step. Said network planning means 75 may utilize a plurality of traffic formulas, including the Engset, Binomial traffic formulas for single access links, while a plurality of circuit and packet switch performance simulation model inputs, indicated by arrow 79, may be utilized to derive near instantaneous performance data on more complex elements of said network 100. Further, said responsive means of the network planning means 75 may measure the results of a plurality of blocking and delay performance calculations, indicated by arrow 72, based on the proposed configuration of said network 100 against said plurality of inputted performance criteria. Said network planning means 75 may also be a computer program.

During said network planning step of the method of the preferred embodiment of the present invention, a plurality of electronic warfare threat inputs, indicated by arrow 82, and, when available, a plurality of previous deployment data input, indicated by arrow 83, may also be considered in constructing said network plan output, arrow 80. Based upon said network plan output, arrow 80, generated during said network planning step, said baseline model 85, having a plurality of specific subscriber unit name inputs, indicated by arrow 86, and a plurality of supporting team inputs, indicated by arrow 87, may be utilized to provide an initial configuration of said network 100.

During said database updating step, a network management work station may host an applications software program, to access said meteorological forecast data input, arrow 64, and said plurality of real-time meteorological information variables, indicated by arrow 65.

In connection with said network realignment step, said network system management system automatically integrating said dynamic network model 90, may be the NPT or any similar system. Said plurality of visual data images, indicated by arrow 94, displayed on said network terminal display means 93, may be color-graphics oriented and achieved via X-windows interfaces in order to integrate operation of said network 100 and operator interaction. Said network terminal display means 93 may be the Terra-CAMMS display manager or any other similar display manager appropriate for the computer system. Said dynamic network model 90 may color-code a plurality of predicted link reliability inputs and a plurality of grade of service (GOS) inputs from said traffic forecast means 59 and may form a color-coded status input, indicated by arrow 96, to said network terminal display means 93. Said network terminal display means 93 may encompass a plurality of mouse click and drag, database and keyboard inputs which may be combined in order to simplify operations. Said network display means 93 may allow clicking on a plurality of equipment sites to explode the view and obtain more detailed information, as well as clicking on communications-links to obtain more detailed status information, such as possible cause of anticipated or actual outage, as well as the cause of link degradation.

During said coefficient adjustment step, said coefficient adjustment means may be a computer program.

Further, the present invention encompasses an automated communications network planning apparatus, also depicted on FIG. 2, for converting meteorological data and traffic data into a dynamic network model 90 shown on a network terminal display means 93, said dynamic network model 90 meeting a plurality of predetermined performance parameters, said apparatus comprising a communications network 100, a means for determining a propagation forecast 70 from a plurality of meteorological data inputs, said propagation forecast means 70 being coupled to a network planning means 75, and a means for determining a traffic forecast 59 from a plurality of traffic data inputs, said traffic forecast means 59 also being coupled to said network planning means 75. Said propagation forecast means 70, having a propagation database 62 and a plurality of propagation planning algorithms, transmits a first plurality of communications-link locations in a propagation forecast output 71 to said network planning means 75. Said traffic forecast means 59, having a traffic database 55, a predicted traffic database 56 and a plurality of traffic algorithms, transmits a second plurality of communications-link locations in a traffic forecast output 61 to said network planning means 75. A plurality of planning algorithms of said network planning means 75 receives said propagation output 71 from said propagation forecast means 70 and said traffic forecast output 61 from said traffic forecast means 59 and said network planning means 75 generates a baseline network model 85 and then said dynamic network model 90 for display on said network terminal display means 93. A means for determining model corrections 110 controls said network planning means 75, said model correction means 110 causing transmission of an adjusted propagation forecast from said propagation forecast means 70 and an adjusted traffic forecast from said traffic forecast means 59, to said network planning means 75, said network planning means 75, having a means for calculating a plurality of model adjustments, generates and then displays said dynamic network model 90, as adjusted, on said network terminal display means 93. Said model correction means 110, having an artificial intelligence program, continuously compares said dynamic network model 90, said network 100 and said predetermined performance parameters and transmits a plurality of network reconfiguration instructions 120 concerning said network 100 to said network terminal display means 93 in order to notify operators of said network 100 to reconfigure said network 100 so that when all components of said network 100 are operational, said network 100 will replicate said dynamic network model 90.

Many of the features and characteristics of the first and preferred embodiments of the method of the present invention may also be utilized in connection with the apparatus of the present invention, including utilizing the apparatus on terrestrial line-of-sight communications networks, as well as communications networks receiving data from a means for inputting data from a plurality of satellites.

Accordingly, having shown and described what are considered to be the preferred and several embodiments of this invention, it should be understood that the same have been shown by way of illustration and not limitation. It should be understood, of course, that the foregoing disclosure relates only to a small number of preferred embodiments and that numerous modifications or alterations may be made therein without departing from the spirit and scope of the invention as set forth in this disclosure and the appended claims. All modifications, alterations and changes coming within the spirit and scope of the invention are hereby meant to be included.

What we claim is:

1. An automated method for planning and managing the performance of a communications network comprising the steps of:

forming a propagation forecast output that models a plurality of communications-link locations in real-time meeting a plurality of predetermined performance parameters in a propagation forecast means from a plurality of stored meteorological forecast inputs, said propagation forecast means having a plurality of propagation algorithms;

transmitting said propagation forecast output to a plurality of planning algorithms of a network planning means;

forming a traffic forecast output from a traffic database and a plurality of communications requirements inputs, said traffic forecast output modeling a plurality of communications-link locations in real-time meeting said plurality of communications requirements inputs and said plurality of predetermined performance parameters in a traffic forecast means, said traffic forecast means having a plurality of traffic algorithms;

transmitting said traffic forecast output to said plurality of planning algorithms;

forming a dynamic network model in said network planning means in real-time, said network planning means, having a plurality of planning algorithms and a means to calculate adjustments to said dynamic network model;

continuously updating a propagation database of said propagation forecast means with a plurality of real-time meteorological measurements from a model correction means, said propagation forecast means automatically transmitting an adjusted propagation forecast to said plurality of planning algorithms of the network planning means;

continuously updating said traffic database and a predicted traffic database of the traffic forecast means with a plurality of radio traffic measurements of said network from said model correction means, said traffic forecast means automatically transmitting an adjusted traffic forecast to said plurality of planning algorithms of the network planning means;

realigning said network by said network planning means calculating a plurality of model adjustments, said network planning means being responsive to both said adjusted traffic forecast and said adjusted propagation forecast, said network planning means instructing the operators to alter the deployment of components of said network;

continuously comparing said dynamic network model, said adjusted propagation forecast, said adjusted traffic forecast and said plurality of predetermined performance parameters with an artificial intelligence program of said model correction means;

adjusting in a coefficient adjustment means a plurality of traffic coefficients of said traffic forecast algorithms, a plurality of propagation coefficients of said propagation forecast algorithms and a plurality of planning coefficients of said network planning means; and said model correction means generating a plurality of reconfiguration instructions to the operators of said network based on said plurality of real-time meteorological measurements, said plurality of traffic measurements, said adjusted propagation forecast, said adjusted traffic forecast and said plurality of predetermined performance parameters.

2. The automated method for planning and managing the performance of a communications network, as recited in claim 1, further comprising said network having a plurality of radio terminals, a plurality of switching nodes and said plurality of predetermined performance parameters.

3. The automated method for planning and managing the performance of a communications network, as recited in claim 2, further comprising said propagation forecast means having a plurality of known responses to meteorological phenomena, along with said propagation database, said plurality of predetermined performance parameters and said plurality of propagation algorithms.

4. The automated method for planning and managing the performance of a communications network, as recited in claim 3, further comprising displaying said dynamic network model, said network and said reconfiguration instructions to the operator on a network terminal display means.

5. An automated method for planning and managing the performance of a communication network comprising the steps of:

forming a propagation forecast output in real-time in a propagation forecast means, said propagation forecast output modeling a plurality of communications-link locations meeting a plurality of predetermined performance parameters, said propagation forecast means having a plurality of stored meteorological forecast inputs, a plurality of predetermined network performance parameters and a plurality of programmed propagation algorithms;

said propagation forecast means transmits said propagation forecast output to a plurality of planning algorithms of a network planning means;

forming a traffic forecast output in a traffic forecasting means from a plurality of communications requirements inputs, said traffic forecast output modeling a second plurality of communications-link locations meeting said plurality of predetermined performance parameters, said traffic forecast means having a traffic database and a predicted traffic database, said predicted traffic database, having a plurality of programmed traffic forecast algorithms;

said traffic forecast means transmits said traffic forecast output to said plurality of planning algorithms;

said network planning means forming a network output plan and combining said network output plan with a link reliability output to generate a baseline network model, said baseline network model having a means responsive to a plurality of real-time meteorological measurements, a plurality of radio traffic measurements and a plurality of network change inputs from said model correction means;

forming a dynamic network model in real-time from said baseline network model, said network planning means having said plurality of planning algorithms and a means to calculate adjustments to said dynamic network model;

continuously updating a propagation database of the propagation forecast means with said plurality of real-time meteorological measurements, said propagation forecast means automatically transmitting an adjusted propagation forecast to said plurality of planning algorithms;

continuously updating said traffic database and said predicted traffic database of the traffic forecast means with said plurality of radio traffic measurements, said traffic forecast means automatically transmitting an adjusted traffic forecast to said plurality of planning algorithms;

realigning said network by said network planning means calculating a plurality of model adjustments, said network planning means being responsive to both said adjusted traffic forecast and said adjusted propagation forecast;

continuously comparing said dynamic network model, said adjusted traffic forecast, said adjusted propagation forecast and said plurality of predetermined network performance parameters in an artificial intelligence program of said model correction means;

adjusting in a coefficient adjustment means a plurality of propagation coefficients of said propagation forecast algorithms, a plurality of traffic coefficients of said traffic forecast algorithms and a plurality of planning coefficients of said planning algorithms of the network planning means; and said model correction means generating a plurality of reconfiguration instructions based on said plurality of real-time meteorological measurements, said plurality of traffic measurements, said adjusted propagation forecast, said adjusted traffic forecast and said predetermined network performance parameters to the operators of said network.

6. The automated method for planning and managing the performance of a communications network, as recited in claim 5, further comprising said network having a plurality of radio terminals, a plurality of switching nodes and said plurality of predetermined performance parameters.

7. The automated method for planning and managing the performance of a communications network, as recited in claim 6, wherein:

said plurality of stored meteorological forecast inputs includes a plurality of known responses to meteorological phenomena;

said traffic database receives a plurality of communications requirements inputs, a plurality of operational facility data inputs and a plurality of operator-adjusted performance criteria;

said plurality of operator-adjusted performance criteria further comprise a plurality of maximum link, node blocking and delay probabilities;

a portion of said traffic database is copied onto said predicted traffic database; and said predicted traffic database, having said plurality of programmed traffic forecast algorithms, calculates a percentage of network-bound traffic output and provides a traffic forecast input to said traffic forecast means.

8. The automated method for planning and managing the performance of a communication network, as recited in claim 7, further comprising:

said plurality of operational facility data inputs describe a plurality of telephones and computers at each of a plurality of subscriber units of said network;

a plurality of call holding data inputs for circuit switch calls, a plurality of packet length data inputs for packet switch calls and a plurality of data inputs from each subscriber unit under different battlefield scenario dependent criteria are provided to said traffic database; and said traffic database is rolled up from each of said plurality of subscriber units of said network to a particular subscriber unit.

9. The automated method for planning and managing the performance of a communication network, as recited in claim 8, further comprising the operator selecting from a plurality communications equipment options, scenarios and types of battlefield criteria during said traffic forecasting step.

10. The automated method for planning and managing the performance of a communication network, as recited in claim 9, further comprising said traffic forecast means accessing a plurality of traffic meter and throughput data inputs from a plurality of switches of said network.

11. The automated method for planning and managing the performance of a communication network, as recited in claim 10, further comprising:

a network management work station, having an applications software program, accessing said meteorological forecast data input and a real-time meteorological information input during said propagation forecasting step;

said network provides an equipment availability and characteristics input through said model correction means to said propagation forecasting means; and said equipment availability input is combined with a projected link reliability factor as part of said propagation forecast output provided to said planning algorithms of the network planning means.

12. The automated method for planning and managing the performance of a communication network, as recited in claim 11, further comprising:

said responsive means of the network planning means receives a switch disability input;

a unit readiness input is provided to said network planning means to account for communications equipment outages when a piece of equipment of said network is inoperable;

a subscriber access input is calculated by said planning algorithms of the network planning means based on a comparison of subscriber unit demand and asset supply of said network; and a plurality of circuit and packet traffic requirements are received by said network planning means during said network planning step.

13. The automated method for planning and managing the performance of a communication network, as recited in claim 12, wherein said network planning means utilizes a plurality of traffic formulas for a plurality of single access links while a plurality of circuit and packet switch performance simulation model inputs, derive a plurality of near-instantaneous performance data on a plurality of complex components of said network.

14. The automated method for planning and managing the performance of a communication network, as recited in claim 13, wherein said responsive means of the network planning means measures a plurality of blocking and delay performance calculation results based on a proposed configuration of said network against said plurality of inputted performance criteria.

15. The automated method for planning and managing the performance of a communication network, as recited in claim 14, further comprising:

utilizing an electronic warfare threat input in forming said network output plan; and utilizing a previous deployment data input in forming said network output plan.

16. The automated method for planning and managing the performance of a communication network, as recited in claim 15, wherein said baseline network model, having a plurality of specific subscriber unit name inputs and a plurality of supporting team inputs, forms an initial configuration of the network.

17. The automated method for planning and managing the performance of a communication network, as recited in claim 16, further comprising:

showing a plurality of visual display images on said network terminal display means;

said network terminal display means is color-graphics oriented and achieved by a plurality of windows interfaces integrating operation of said network and operator interaction;

said network model provides a color-coded status input to said network terminal display means;

said network terminal display means provides a plurality of mouse click and drag, database and keyboard inputs;

said network terminal display means allows clicking on a plurality of equipment sites providing an exploded view and obtaining a plurality of more detailed data inputs;

said network terminal display means allows clicking on a plurality of communications-link locations to obtain a plurality of more detailed status inputs; and said network model being automatically integrated by a network management system.

18. The automated method for planning and managing the performance of a communication network, as recited in claim 17, wherein said plurality of mouse click and drag, database and keyboard inputs are combined.

19. The automated method for planning and managing the performance of a communication network, as recited in claim 18, further comprising a display manager means.

20. The automated method for planning and managing the performance of a communication network, as recited in claim 19, wherein said network model color-codes a plurality of predicted link reliability inputs and a plurality of grade of service inputs from said traffic forecast means.

21. The automated method for planning and managing the performance of a communication network, as recited in claim 20, wherein:

said propagation forecast means is a computer program;

said traffic forecast means is a computer program;

said network planning means is a computer program; and said coefficient adjustment means is a computer program.

22. The automated method for planning and managing the performance of a communication network, as recited in claim 13, wherein one of said plurality of traffic formulas is an Engset traffic formula.

23. The automated method for planning and managing the performance of a communication network, as recited in claim 13, wherein one of said plurality of traffic formulas is a Binomial traffic formula.

24. The automated method for planning and managing the performance of a communication network, as recited in claim 6, wherein said network is a terrestrial line-of-sight communications network.

25. The automated method for planning and managing the performance of a communication network, as recited in claim 24, further comprising a means for inputting a plurality of data inputs from a plurality of satellites.

26. An automated communications network planner for converting meteorological data and traffic data into a dynamic network model on a network terminal display means, said dynamic network model meeting a plurality of predetermined performance parameters of a communications network, comprising:

said communications network;

means for determining a propagation forecast in real-time from a plurality of stored meteorological forecast inputs, said propagation forecast means, having a propagation database and a plurality of propagation algorithms, being coupled to a network planning means;

means for determining a traffic forecast in real-time from a plurality of traffic data inputs, said traffic forecast means, having a traffic database, a predicted traffic database and a plurality of traffic algorithms, being coupled to said network planning means;

a plurality of planning algorithms of said network planning means receives a propagation output from said propagation forecast means and a traffic forecast output from said traffic forecast means;

said network planning means generates said dynamic network model;

a means for determining model corrections, controlling said network planning means, continuously updates said propagation database with a plurality of real-time meteorological measurements, said propagation forecast means automatically transmitting an adjusted propagation forecast to said plurality of planning algorithms of the network planning means;

said model correction means continuously updates said traffic database with a plurality of radio traffic measurements, said traffic forecast means automatically transmitting an adjusted traffic forecast to said plurality of planning algorithms of the network planning means;

said network planning means, having a means for calculating a plurality of model adjustments;

said model correction means, having an artificial intelligence program, continuously compares said dynamic network model and said predetermined performance parameters;

a coefficient adjustment means adjusts a plurality of propagation coefficients of said propagation traffic algorithms, a plurality of traffic coefficients of said traffic algorithms and a plurality of planning coefficients of said planning algorithms; and said artificial intelligence program continuously compares said plurality of real-time meteorological measurements, said plurality of radio traffic measurements, said adjusted propagation forecast, said adjusted traffic forecast and said predetermined network performance parameters to generate a plurality of network reconfiguration instructions for display on said display means.

27. The automated communications network planner, as recited in claim 26, further comprising said network having a plurality of radio terminals, a plurality of switching nodes and said plurality of predetermined performance parameters.

28. The automated communications network planner, as recited in claim 27, further comprising said plurality of stored meteorological forecast inputs includes a plurality of known responses to meteorological phenomena.

29. The automated communications network planner, as recited in claim 28, further comprising:

said propagation forecast output models a first plurality of communications-link locations meeting said plurality of predetermined performance parameters, said plurality of first communications-link locations further comprising a description of signal power and noise power for each communications channel in each link;

said traffic forecast output models a second plurality of communications-link locations meeting said plurality of predetermined performance parameters, said plurality of second communications-link locations further comprising a description of signal power and noise power for each of said communications channels in each of said links;

said network planning means combines a network output plan with a link reliability output to generate a baseline network model;

said baseline network model, having a means responsive to said plurality of real-time meteorological measurements, said plurality of radio traffic measurements and a plurality of network change inputs from said model correction means, generates said dynamic network model; and said network planning means being responsive to said adjusted traffic forecast and said adjusted propagation forecast.

30. The automated communications network planner, as recited in claim 29, further comprising:

said traffic database receives a plurality of communications requirements inputs, a plurality of operational facility data inputs and a plurality of operator-adjusted performance criteria along with said plurality of predetermined performance parameters, said plurality of operational facility data inputs describing a plurality of telephones and computers at each of a plurality of subscriber units of said network;

said plurality of operator-adjusted performance criteria includes a plurality of maximum link, node blocking and delay probabilities;

a portion of said traffic database is copied onto said predicted traffic database;

said predicted traffic database, having said plurality of traffic forecast algorithms, calculates a percentage of network-bound traffic output and provides a traffic forecast input to said traffic forecast means;

said traffic database receives a plurality of call holding data inputs for circuit switch calls, a plurality of packet length data inputs for packet switch calls and a plurality of data inputs from each subscriber unit under different battlefield scenario dependent criteria; and said traffic database is rolled up from each of said plurality of subscriber units of said network to a particular subscriber unit.

31. The automated communications network planner, as recited in claim 30, further comprising:

said traffic database receives a plurality of communications requirements inputs, a plurality of operational facility data inputs and a plurality of operator-adjusted performance criteria, further comprising a plurality of maximum link, node blocking and delay probabilities; and said plurality of traffic forecast algorithms calculates a percentage of network-bound traffic output and said predicted traffic database provides a traffic forecast input to said traffic forecast means.

32. The automated communications network planner, as recited in claim 31, further comprising:

said traffic forecasting means allows the operator to select from a plurality of communications equipment options, a plurality of scenarios and a plurality of battlefield criteria; and said traffic forecast means accessing a plurality of traffic meter and throughput data inputs from a plurality of switches of said network.

33. The automated communications network planner, as recited in claim 32, further comprising:

a network management work station, having an applications software program, accessing said plurality of stored meteorological forecast inputs and a real-time meteorological information input;

said model correction means provides an equipment availability input of said network to said propagation forecasting means;

said propagation forecast output combines said equipment availability input with a projected link reliability factor to said planning algorithms;

said responsive means of the network planning means receives a switch disability input;

said network planning means receives a unit readiness input to account for communications equipment outages when a piece of equipment of said network is inoperable;

said plurality of planning algorithms of the network planning means calculates a subscriber access input by comparing a plurality of subscriber unit demands with the number of said components of said network;

said network planning means receives a plurality of circuit and packet traffic requirements; and said network planning means, having a plurality of traffic formulas for a plurality of single access links, receives a plurality of circuit and packet switch performance simulation model inputs to derive a plurality of near-instantaneous performance data inputs from a plurality of complex components said network.

34. The automated communications network planner, as recited in claim 33, further comprising:

said responsive means of the network planning means measures a plurality of blocking and delay performance calculation results based on a proposed configuration of said network against a plurality of inputted performance criteria;

said baseline network model receives an electronic warfare threat input and a previous deployment data input to form said network output plan; and said baseline network model, having a plurality of specific subscriber unit name inputs and a plurality of supporting team inputs, forms an initial configuration of the network.

35. The automated communications network planner, as recited in claim 34, further comprising:

said network terminal display means, being color-graphics oriented, allows a plurality of windows interfaces to integrate operation of said network and operator interaction;

said network model provides a color-coded status input to said network terminal display means;

said network terminal display means provides a plurality of mouse click and drag, database and keyboard inputs and allows clicking on a plurality of equipment sites to provide an exploded view and obtain a plurality of more detailed data inputs;

said display means allows clicking on a plurality of communications links to obtain a plurality of more detailed status inputs; and a network management system automatically integrates said dynamic network model.

36. The automated communications network planner, as recited in claim 35, further comprising:

combining said plurality of mouse click and drag, database and keyboard inputs; and a display manager means.

37. The automated communications network planner, as recited in claim 36, further comprising said network model color-codes a plurality of predicted link reliability inputs and a plurality of grade of service inputs from said traffic forecast means.

38. The automated communications network planner, as recited in claim 37, wherein:

said propagation forecast means is a computer program;

said traffic forecast means is a computer program;

said network planning means is a computer program; and said coefficient adjustment means is a computer program.

39. The automated communications network planner, as recited in claim 33, wherein one of said plurality of traffic formulas is an Engset traffic formula.

40. The automated communications network planner, as recited in claim 33, wherein one of said plurality of traffic formulas is a Binomial traffic formula.

41. The automated communications network planner, as recited in claim 27, wherein said network is a terrestrial line-of-sight communications network.

42. The automated communications network planner, as recited in claim 41, further comprising a means for inputting a plurality of data inputs from a plurality of satellites.

* * * * *